Jan. 23, 1940. M. KATCHER 2,188,006
HOSE COUPLING
Filed March 29, 1937 2 Sheets-Sheet 1
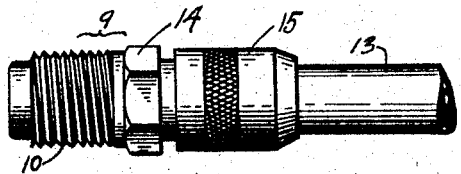
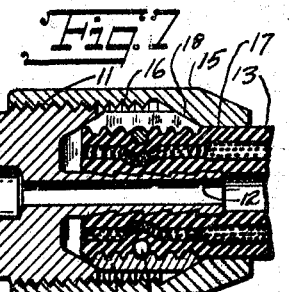
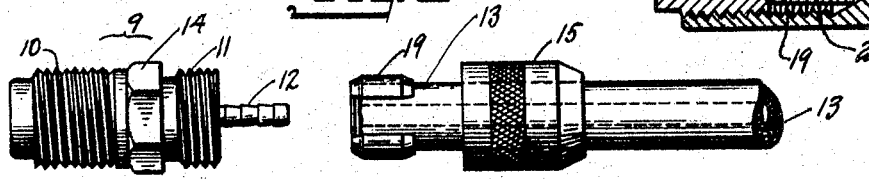
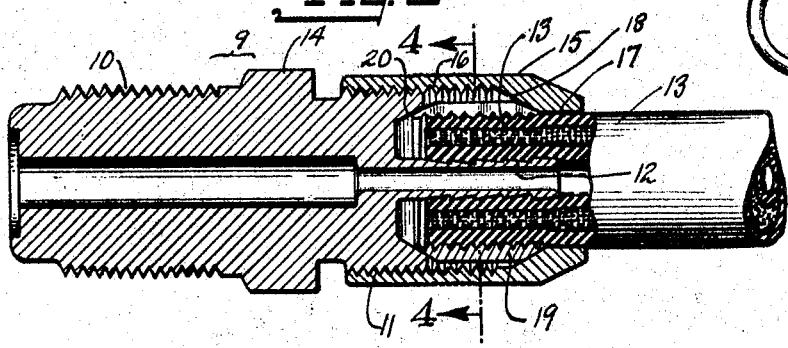
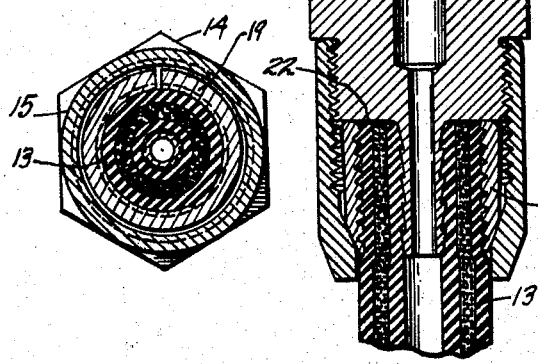
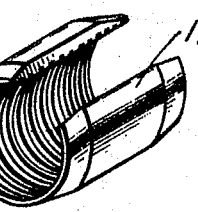
INVENTOR
Morris Katcher
BY
Emanuel Scheyer
ATTORNEY Jan. 23, 1940.　　　　M. KATCHER　　　　2,188,006
HOSE COUPLING
Filed March 29, 1937　　　　2 Sheets-Sheet 2
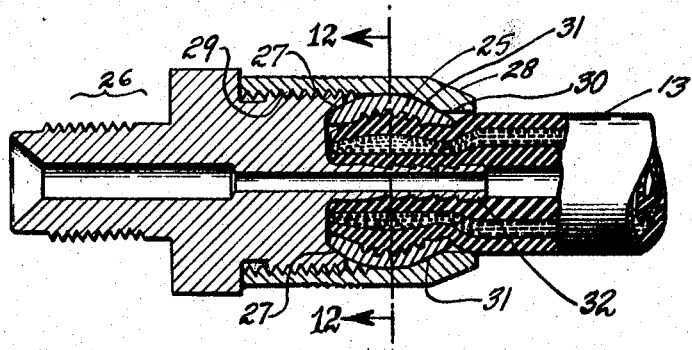
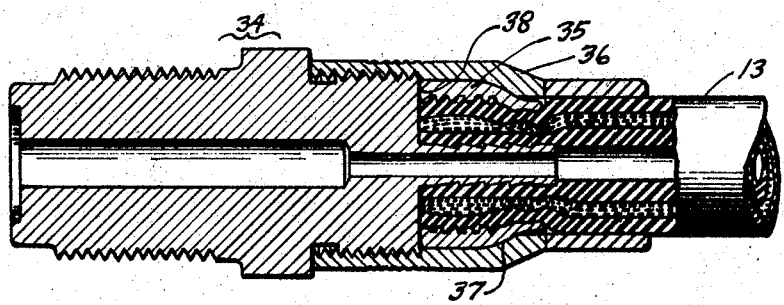
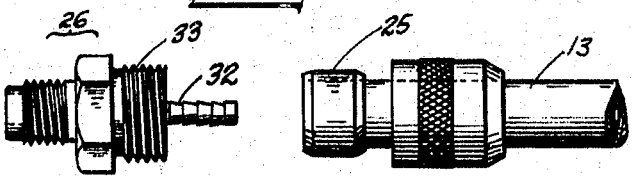
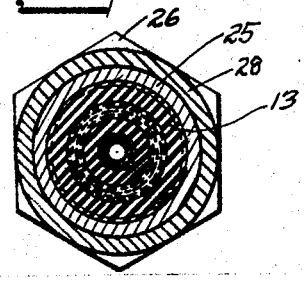
INVENTOR
*Morris Katcher*
BY
*Emanuel Scheyer*
ATTORNEY Patented Jan. 23, 1940

2,188,006

UNITED STATES PATENT OFFICE 2,188,006

HOSE COUPLING

Morris Katcher, New York, N. Y.

Application March 29, 1937, Serial No. 133,513

1 Claim. (Cl. 285—86)

This invention relates to hose couplings for use in connection with rubber or other non-metallic flexible hose or conduit, especially for motor cars. The coupling is especially useful where a flexible hose is to be attached to a rigid member or to interconnect relatively movable parts as in a hydraulic brake system.

The coupling is suitable for systems operating with extremely high fluid pressures as in said brake system.

Another object of the invention is to provide a simple and reliable coupling which will be easy to assemble and take apart. When taken apart or separated from the hose, no portions of the coupling, in one form of my device, need be discarded, all parts being suitable for use again. In certain types of couplings now in use, certain parts are permanently deformed in attaching the hose to the coupling, requiring new parts when the coupling is to be used again on the same or another piece of hose. Further, said permanent deformation also makes it difficult to remove the hose from the coupling. With said form of my invention, repair shop mechanics can replace fresh hose on the couplings by the simple use of an ordinary pipe wrench.

My device uses a separate bushing. In the form noted above, this bushing is given elastic deformation only. In another form, the bushing is permanently deformed. A construction common to both forms provides tapers at both ends for the deformation of the bushing.

Other objects and advantages will become apparent upon further study of the description and drawings, in which:

Fig. 1 is an elevation of the coupling with a piece of hose attached.

Fig. 2 is an elevation of the coupling with its mating parts unscrewed, the split bushing and sleeve being shown loosely mounted on a piece of hose.

Fig. 3 is a longitudinal section to an enlarged scale through the coupling and a part of a piece of attached hose, the upper part of the section passing through the split bushing at the split.

Fig. 4 is a cross-section taken along the line 4—4 of Fig. 3.

Fig. 5 is a perspective view of the split bushing shown by itself.

Fig. 6 is a fragmental longitudinal section to an enlarged scale through an alternative form of coupling with a piece of hose attached.

Fig. 7 is a fragmental longitudinal section to an enlarged scale of the coupling of Fig. 3 with the interposition of a ring of split wire between the split bushing and the piece of hose shown, the lower part of the section passing through the ring at the split.

Fig. 8 is an elevation of the split ring.

Fig. 9 is a longitudinal section to an enlarged scale of a modified form of the coupling, shown in Fig. 3, having a bushing with circumferentially continuous walls throughout.

Fig. 10 is a longitudinal section to an enlarged scale of a modified form of the coupling of the type of Fig. 6, but with a bushing having circumferentially continuous walls throughout.

Fig. 11 is an elevation of the form of coupling shown in Fig. 9, with the mating parts unscrewed, the bushing and sleeve being shown loosely mounted on a piece of hose, and Fig. 12 is a cross-section taken along the line 12—12 of Fig. 9.

The body 9 is provided with a threaded portion 10 at one end, adapting it to be screwed into a mating part, not shown, of a fluid system. At the other end of body 9 is a threaded portion 11. Nipple 12 extends rearwardly from the rear face of said body. Nipple 12 is straight, being barbed or serrated for better fluid tight contact with the bore of rubber hose 13. The term "straight" is used as opposed to conical. Body 9 is formed with a nut portion 14 thereon intermediate of threaded portions 10 and 11. The rear face of body 9 is countersunk and tapered, as shown at 20. Sleeve 15 is knurled on the outside and the forward portion of its bore is threaded at 16. The diameter of the rear portion 17 of its bore is substantially equal to the outside diameter of hose 13. The portion 18 of said bore intermediate of threaded portion 16 and rear portion 17 tapers down from the diameter of the bore at portion 16 to that at portion 17.

Split bushing 19 has a serrated bore and when open has roughly a diameter equal to the normal outside diameter of hose 13. The outside of bushing 19 is beveled at both ends.

To attach hose 13 to body 9, sleeve 15 and bushing 19 are first loosely mounted on the end of hose 13. Nipple 12 is then pushed into hose 13. Threaded portion 16 of sleeve 15 is then screwed on threaded portion 11 of body 9. As sleeve 15 is screwed on, its tapered portion 18 rides on the rear bevel of bushing 19. At the same time the countersunk portion 20 of body 9 rides on the front bevel of bushing 19. This closes bushing 19, causing it to compress hose 13 tightly about nipple 12.

The alternate form shown in Fig. 6 is similar to that shown in Figs. 1 to 5 inclusive, except that bushing 21 has no bevel at its forward end, a bevel being provided only at its rear end, and body 23 has a flat rear face 22, instead of the countersunk face 20 of body 9 in Fig. 3.

The form shown in Fig. 7 is similar to that shown in Figs. 1 to 5 inclusive but with the addition of a split ring 24 interposed between the inside of bushing 19 and hose 13. Ring 24 is so set in bushing 19 that its split is away from the split in the bushing. Ring 24 causes hose 13 to be subjected to a very much higher compression locally in the region of the ring, than elsewhere, yet requiring not much increase in the force used to screw on sleeve 15. This local increase in pressure acts as a very efficient fluid stop.

In the form shown in Figs. 9, 11 and 12, a soft brass bushing 25 is used. This bushing further differs from bushing 19 shown in Fig. 5, in that it has walls continuous circumferentially.

Body 26 of Figs. 9, 11 and 12 is in general similar to body 9 of Fig. 3, and has its rear face countersunk and tapered at 27. Sleeve 28 has the forward portion of its bore threaded at 29. The diameter of the rear portion 30 of its bore is substantially equal to the outside diameter of hose 13. The portion 31 of said bore, intermediate of threaded portion 29 and rear portion 30, tapers down from the diameter of the bore at threaded portion 29 to that at portion 30. The outside of bushing 25, when undeformed, is beveled at both ends, as seen in Fig. 11. With bushing 25 and sleeve 28, loosely mounted on hose 13, as shown in Fig. 11, the end of the hose is pushed on nipple 32. Threaded portion 29 of sleeve 28 is then screwed on threaded portion 33 of body 26. As sleeve 28 is screwed on, its tapered portion 31 rides on the rear bevel of bushing 25.

At the same time, the tapered portion 27 of body 26 rides on the front bevel of bushing 19. Continued screwing on of sleeve 28 crushes in the front and rear ends of bushing 25 so that it bites into hose 13. In the modified form shown in Fig. 10, the rear face 38 of body 34 is flat instead of tapered as in Fig. 9. Soft brass bushing 35 is beveled at its rear end only. Sleeve 36 has a tapered portion 37 for engaging the taper at the rear of bushing 35, as said sleeve is screwed onto body 34. Continued screwing of sleeve 36, crushes in the rear end of bushing 25 so that it bites into hose 13.

In all the forms of my coupling illustrated, the forward end of the bushings 19, 21, 25 and 35 is forced against the rear face of body 9, 23, 26 or 34. For example, in Fig. 3, the forward end of bushing 19 is forced against taper 20 at the rear of body 9 and in Fig. 6, the forward end of bushing 21 is forced against the rear face 22 of body 23.

I claim:

A coupling member adapted to be attached to the end of a hose, comprising a body, a nipple extending rearwardly from the body for insertion into the hose, a sleeve fitting on the hose suitable for screwing up from the rear upon the body, a split spring bushing placed over the hose and inside the sleeve, and a split wire ring placed on the hose inside the bushing, said sleeve and bushing having tapered mating portions reducing the bushing in diameter for clamping the hose on the nipple and for forcing the ring into the hose, when said nipple is screwed up, said bushing being of sufficient length to clamp a substantial length of hose to the nipple beyond said ring.

MORRIS KATCHER.